United States Patent
Ashiya et al.

(10) Patent No.: US 6,927,549 B2
(45) Date of Patent: Aug. 9, 2005

(54) ELECTRIC MOTOR CONTROL UNIT

(75) Inventors: Hiroyuki Ashiya, Shizuoka (JP);
Makoto Nakayama, Shizuoka (JP);
Hironori Saito, Kanagawa (JP)

(73) Assignee: Yazaki Corporation, Tokyo (JP)

( * ) Notice: Subject to any disclaimer, the term of this patent is extended or adjusted under 35 U.S.C. 154(b) by 71 days.

(21) Appl. No.: 10/368,004

(22) Filed: Feb. 19, 2003

(65) Prior Publication Data

US 2003/0169007 A1 Sep. 11, 2003

(30) Foreign Application Priority Data

Feb. 19, 2002 (JP) ........................................ 2002-041419

(51) Int. Cl.[7] .............................. H02P 1/00; H02P 1/26; H02H 5/04; G05B 5/00
(52) U.S. Cl. ........................ 318/471; 318/473; 388/934; 361/24; 361/25
(58) Field of Search ................................ 318/139, 783, 318/471–473; 388/934; 361/24, 25

(56) References Cited

U.S. PATENT DOCUMENTS

| | | | | |
|---|---|---|---|---|
| 4,290,145 A | * | 9/1981 | Saba et al. ................... | 455/113 |
| 4,408,244 A | * | 10/1983 | Weible ......................... | 361/24 |
| 4,550,277 A | * | 10/1985 | Carney ......................... | 388/809 |
| 4,609,854 A | * | 9/1986 | Yamamoto et al. .......... | 318/471 |
| 4,626,753 A | * | 12/1986 | Letterman .................... | 388/809 |
| 4,849,677 A | * | 7/1989 | Kruger ......................... | 318/473 |
| 5,123,081 A | * | 6/1992 | Bachman et al. ........... | 388/815 |
| 5,134,351 A | * | 7/1992 | Msihid ......................... | 318/541 |
| 5,311,615 A | * | 5/1994 | Couetoux ..................... | 388/836 |
| 5,341,077 A | * | 8/1994 | Chen et al. .................. | 318/434 |
| 6,556,404 B2 | * | 4/2003 | Figueroa et al. ............ | 361/93.1 |
| 6,603,277 B2 | * | 8/2003 | Yoshimura ................... | 318/139 |
| 6,614,194 B2 | * | 9/2003 | Kobayashi et al. .......... | 318/111 |
| 2004/0052510 A1 | * | 3/2004 | Hsu et al. .................... | 388/804 |

* cited by examiner

*Primary Examiner*—David Martin
*Assistant Examiner*—Patrick Miller
(74) *Attorney, Agent, or Firm*—Armstrong, Kratz, Quintos, Hanson & Brooks, LLP (57) ABSTRACT

An electric motor control unit mounted in an automotive vehicle having a motor that is variable in its rotational speed. A temperature sensing element is arranged to contact a busbar so that relays permit switching operation in response to detection of abnormal heat generation. This controls an electrical power supply to the motor to decrease the rotational speed of the motor without complete stopping of the motor. The rotational speed of the motor returns to a normal speed from the decreased speed by switching operation of the relays with diminishing of the abnormal heat generation.

9 Claims, 7 Drawing Sheets

| ROTATIONAL SPEED<br>TERMINAL | LOW | MIDDLE | | | | HIGH |
|---|---|---|---|---|---|---|
| 3 a | ON | ON | ON | ON | OFF | ON |
| 3 b | OFF | ON | ON | OFF | ON | ON |
| 3 c | OFF | ON | OFF | ON | ON | ON |
| 3 d | ON | OFF | ON | ON | ON | ON |

ELECTRIC MOTOR CONTROL UNIT

BACKGROUND OF THE INVENTION

1. Field of the Invention

The present invention relates to an electric motor control unit for controlling a rotational speed of a motor used for a cooling fan of a radiator mounted on an automotive vehicle, particular to a motor control unit for controlling the rotational speed of the motor based on detection of overcurrent supplied to the motor.

2. Description of the Related Art

Conventionally, for overcurrent protection of a cooling fan of a radiator mounted on an automotive vehicle, fuses have been generally used. This causes various problems, which will be described hereinafter with reference to the accompanying drawings.

Figure 8:
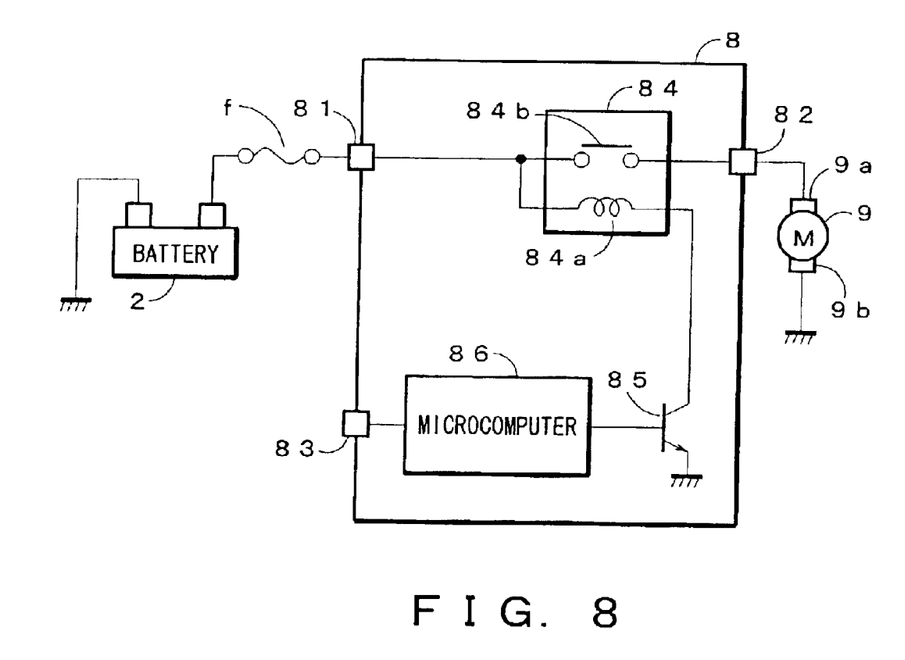
FIG. 8 is a circuit diagram showing a conventional motor control unit.

FIG. 8 is a circuit diagram showing an example of a conventional motor control unit. The motor control unit is assembled in an electric junction box incorporated with a function circuit. The electric junction box is called as a junction block that is mounted on many recent automotive vehicles.

An electric junction box 8 shown in FIG. 8 has a power input terminal 81 and an output terminal 82 which are electrically connected respectively to a battery 2 or a motor 9. The battery 2 is, for example, a known 12-volt battery, and the motor 9 is used for driving an engine cooling fan. The motor 9 has, for example, a power terminal 9a and a ground terminal 9b.

The electric junction box 8 accommodates a microcomputer 86 for receiving external control signals via a signal input terminal 83 and for outputting signals to a transistor 85 to open and close a relay 84. The relay 84 closes a contact 84b on excitation of a coil 84a due to a constant current supplied from the battery 2 to deliver an electrical power to the motor 9. Between the battery 2 and the power input terminal 81, there is provided a fuse f.

In this configuration, for example, the microcomputer 86 receives an external control signal via the signal input terminal 83 to start the motor 9, so that the microcomputer 86 outputs a high level signal to turn the transistor 85 on. Thereby, electrical current flows from the battery 2 to the coil 84a of the relay 84 via the power input terminal 81 to close the contact 84b. Accordingly, the motor 9 supplies an electrical power to the power terminal 9a of the motor 9 via the contact 84b of the relay 84 and the output terminal 82. This operates the motor 9. On the contrary, the microcomputer 86 receives an external control signal via the signal input terminal 83 to stop the motor 9, so that the motor 9 is brought into its stopped state.

During an operating state of the motor 9, overcurrent generally blows the fuse f for preventing damage of circuit parts. However, since the fuse has a variation in a fusing performance thereof, the fuse will not possibly be blown at a predetermined overcurrent for the relay coil. This will possibly cause damage of the coil due to the overcurrent, decreasing usage lives of the circuit parts.

Even when the fuse f is blown correctly, another problem occurs as described hereunder. For example, during an operating state of the vehicle to run through a flooded road, the cooling fan driven by the motor 9 may be completely or almost locked due to water immersion. The motor 9 tends to continue the rotation against a resistance force of the water. This generates overcurrent called as a lock current, which blows the fuse f to stop the motor 9. A continued operation of the vehicle with the fuse f having been blown may cause an undesirably high water temperature of the radiator when the vehicle has run through the flooded road but a driver fails to recognize the stopped state of the motor. Accordingly, the provision of the overcurrent protection fuse of the conventional art includes the aforementioned problem.

SUMMARY OF THE INVENTION

In view of the above-mentioned situation, an object of the invention is to provide an motor control unit for reliably preventing damage of circuit parts due to overcurrent with keeping a normal function of a system related to a motor.

For solving the problem, as illustrated in FIGS. 1 to 5, an electric motor control unit mounted in an automotive vehicle is characterized in that the motor control unit comprises:

a motor 3, 3', or 3" supplied with an electrical power from a battery 2, the motor being variable in its rotational speed, a temperature sensing element 18s disposed at a position of the motor control unit where abnormal heat is generated due to overcurrent supplied to the motor, and a rotational speed control means for reducing the rotational speed of the motor without stopping the motor based on detection of abnormal heat generation by the temperature sensing element.

Thus, the temperature sensing element is disposed at a position of the motor control unit where abnormal heat is generated due to overcurrent supplied to the motor, and the rotational speed control means reduces the rotational speed of the motor without stopping the motor based on detection of abnormal heat generation by the temperature sensing element. This reliably prevents damage of circuit parts due to overcurrent with keeping a normal function of a system related to the motor.

Preferably, the motor is used for driving a cooling fan of a radiator. Thus, the rotational speed decrease of the motor for driving the cooling fan of the radiator against an overcurrent state of the motor prevents damage of circuit parts due to overcurrent.

Preferably, the rotational speed control means has a plurality of relays arranged between the battery and the motor, and one of the relays permits switching operation based on detection of abnormal heat generation to control an electrical power supplied to the motor so as to reduce the rotational speed of the motor.

Thus, the one of the relays permits switching operation to control an electrical power supplied to the motor so as to reduce the rotational speed of the motor. The combination of the relays and the motor allows a protection from an overcurrent state and can cools the engine.

Figure 1:
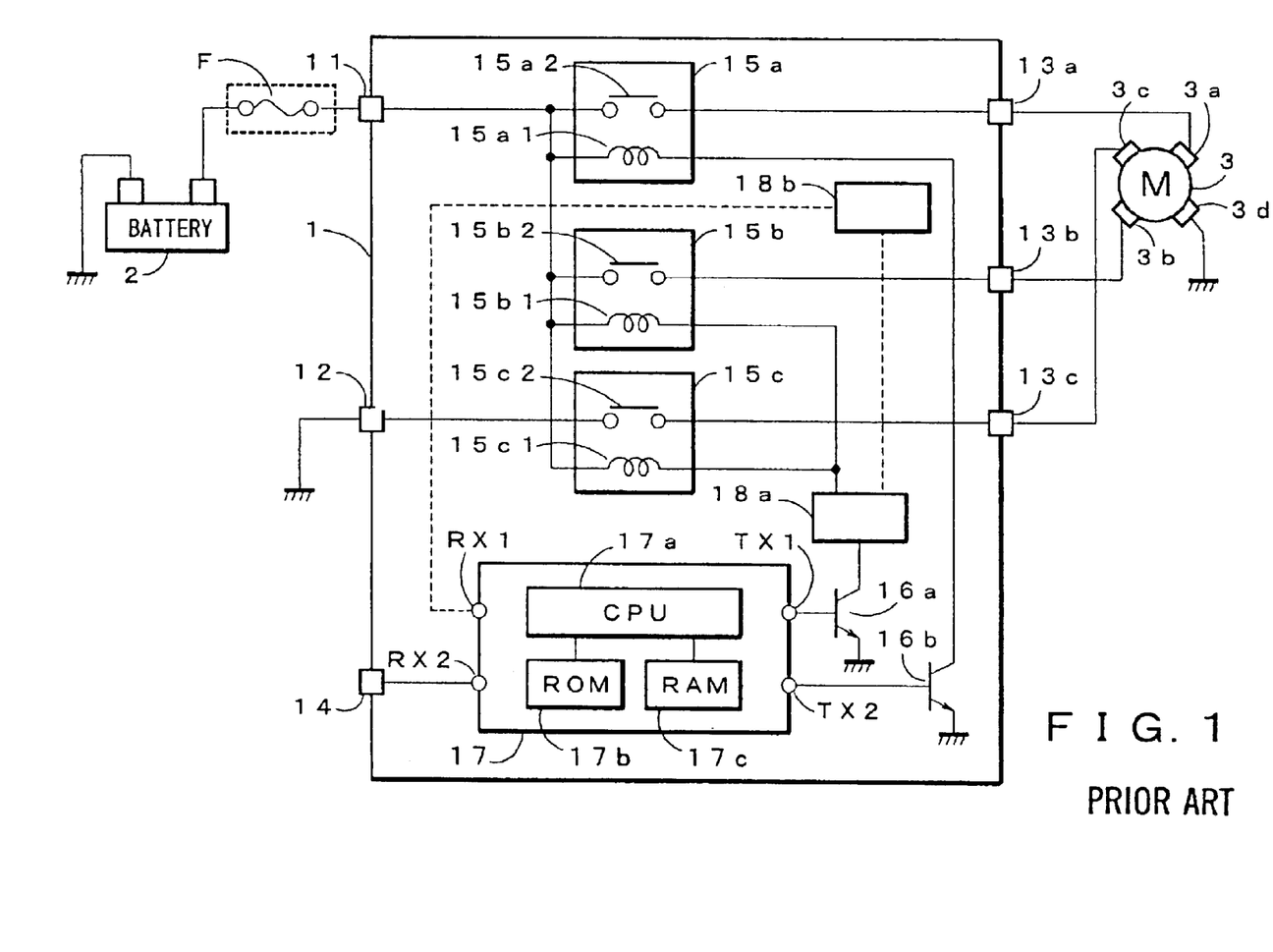
FIG. 1 is a circuit diagram related to an embodiment of a motor control unit according to the present invention.

Preferably, as illustrated in FIG. 1, the motor 3 has four terminals including three input terminals 3a, 3b, and 3c for changing the rotational speed of the motor to become any of high, middle, and low speeds by selecting on-off states of the three input terminals, and each of the relays is respectively connected to each of the three input terminals, wherein the relays can switch the on-off states of the input terminals based on detection of abnormal heat generation by the temperature sensing element to change the rotational speed of the motor to a lower speed.

Thus, the three relays can switch the on-off states of the input terminals based on detection of abnormal heat generation by the temperature sensing element to change the rotational speed of the motor to a lower speed. The combination of the relays and the motor allows a protection from an overcurrent state and can cools the engine.

Figure 5A:
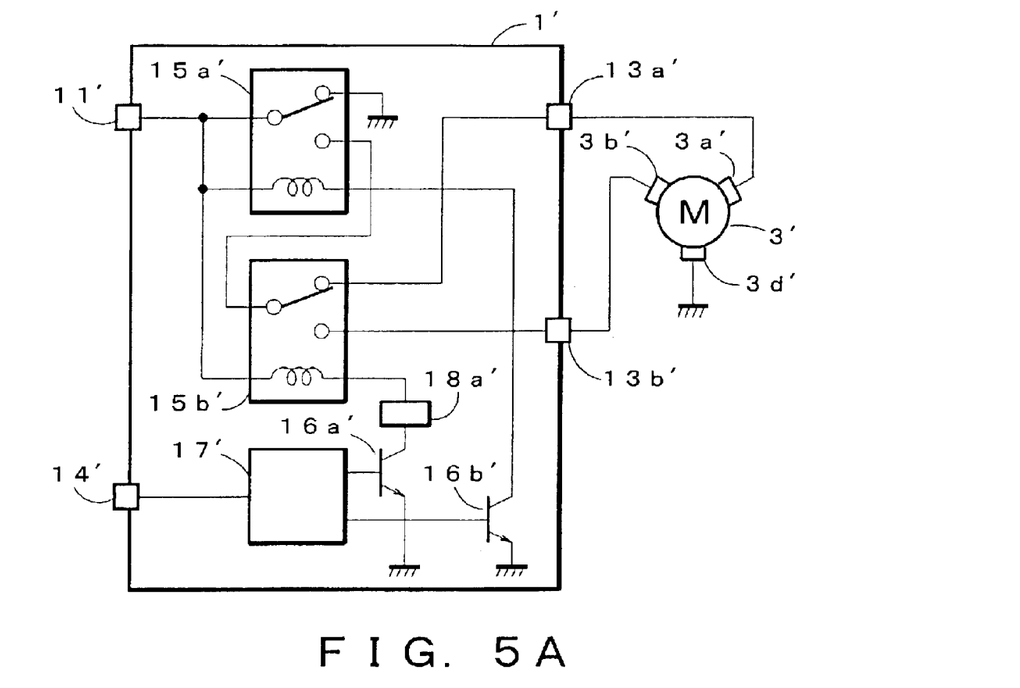
FIGS. 5A and 5B are each a circuit diagram related to another embodiment of a motor control unit according to the present invention.

Preferably, as illustrated in FIG. 5A, the motor 3' has three terminals including two input terminals 3a', 3b' for changing the rotational speed of the motor to become any of high and low speeds by selecting on-off states of one 15b' of the two input terminals, and each of the relays is respectively connected to each of the two input terminals, wherein the one 15b' of the relays can perform switching operation to control the on-off states of the input terminals based on detection of abnormal heat generation by the temperature sensing element to change the rotational speed of the motor from the high speed to the low speed.

Thus, the one of the relays can perform switch operation to control the on-off states of the input terminals based on detection of abnormal heat generation by the temperature sensing element to change the rotational speed of the motor from the high speed to the low speed. The combination of the relays and the motor allows a protection from an overcurrent state and can cools the engine.

Figure 5B:
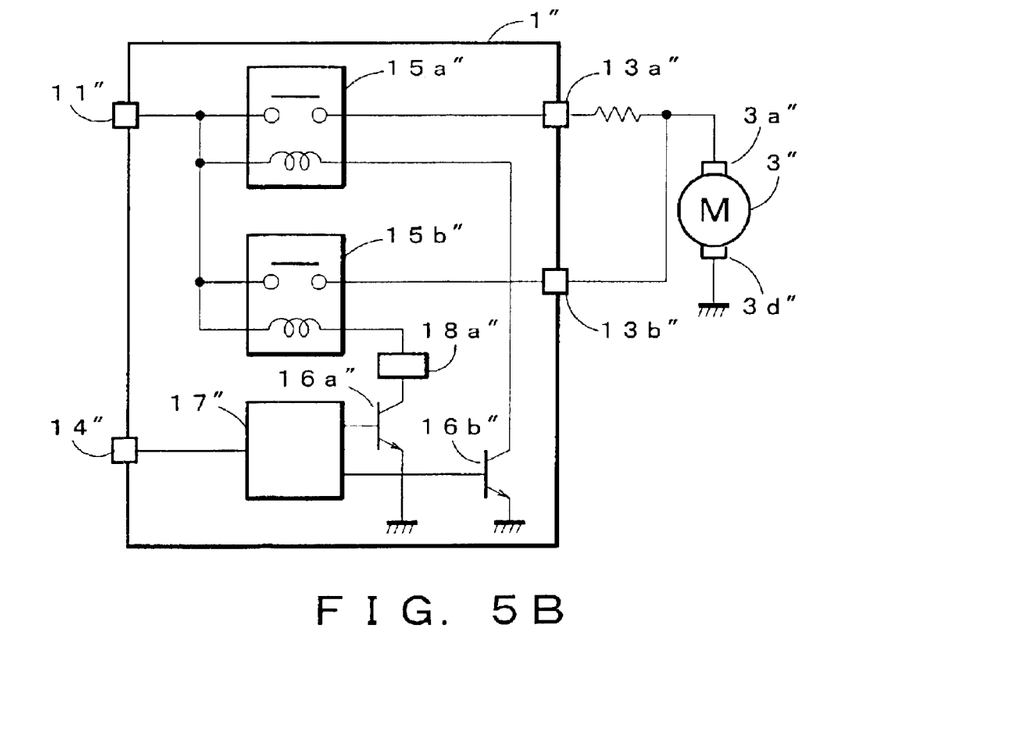

Preferably, as illustrated in FIG. 5B, the motor 3" has one input terminal 15a" and one output terminal 15b", the rotational speed of the motor being variable with current supplied to the input terminal, and two of the relays are connected to the input terminals for allowing the rotational speed of the motor to be variable, wherein the relays can perform switching operation based on detection of abnormal heat generation by the temperature sensing element to change the rotational speed of the motor to a lower one.

Thus, the relays can perform switching operation based on detection of abnormal heat generation by the temperature sensing element to change the rotational speed of the motor to a lower one. The combination of the relays and the motor allows a protection from an overcurrent state and can cools the engine.

Figure 2A:
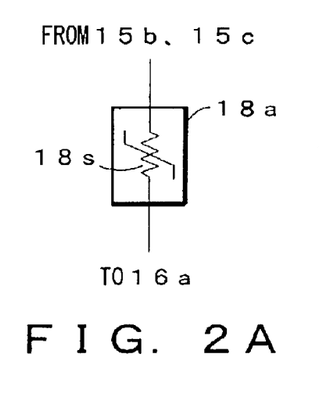
FIG. 2A shows a circuit for temperature detection and current shut-down of FIG. 1.
Figure 2B:
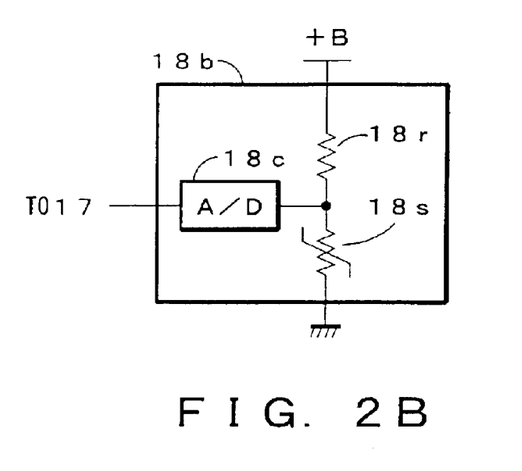
FIG. 2B shows a circuit for temperature detection of FIG. 1.
Figure 4A:
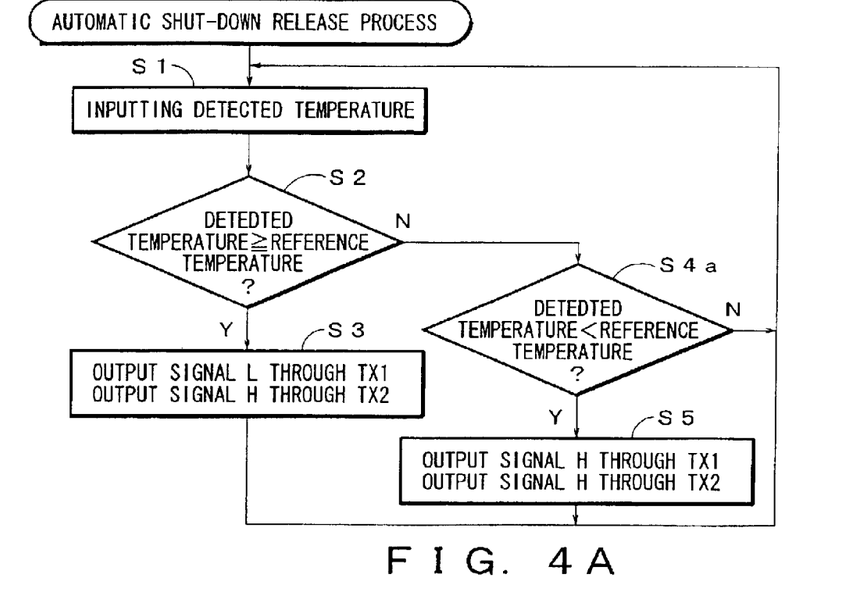
FIG. 4A is a flowchart showing an automatic current-shut-down releasing process.

Preferably, as illustrated in FIGS. 1, 2B, and 4A, the one of relays operates to reduce the rotational speed of the motor when a temperature detected by the temperature sensing element is higher than a reference temperature showing abnormal heat generation, and the one of relays operates to return the rotational speed of the motor to a normal speed when a temperature detected by the temperature sensing element has become lower than the reference temperature.

Thus, the decreased rotational speed of the motor at abnormal heat generation state prevents damage of circuit parts. Furthermore, the rotational speed of the motor returns to a previous normal speed when a sensed temperature becomes normal again.

Figure 4B:
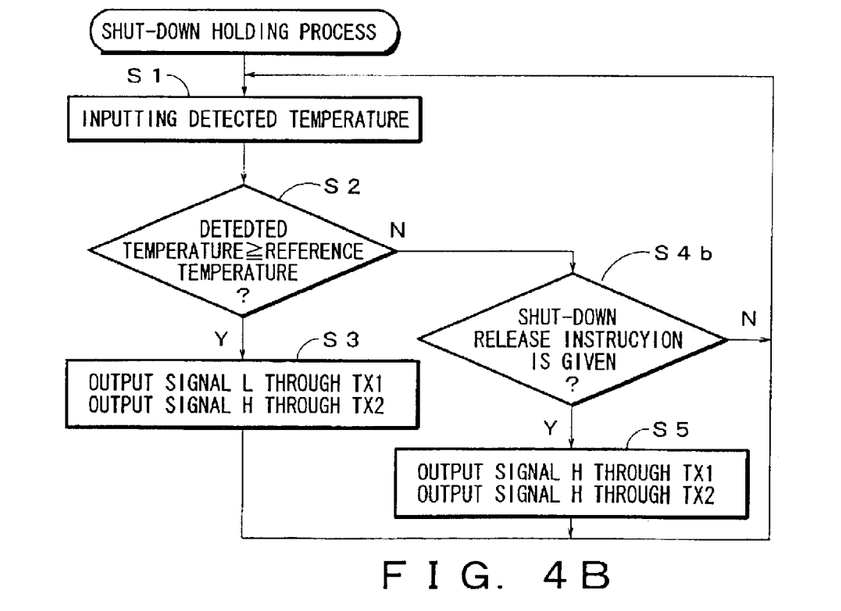
FIG. 4B is a flowchart showing a current-shut-down holding process.

Preferably, as illustrated in FIGS. 1, 2B, and 4B, the one of relays operates to reduce the rotational speed of the motor when a temperature detected by the temperature sensing element is higher than the reference temperature, and the reduced speed of the motor is kept until a predetermined release command is given to the motor control unit.

This can reduce the rotational speed of the motor against an abnormal heat generation state to prevent damage of circuit parts even after the rotational speed of the motor is brought back to a normal one with diminishing of the abnormal heat generation.

Preferably, as illustrated in FIGS. 1 and 2A, the temperature sensing element is a thermistor one end of which is grounded and the other end of which is connected to the one of relays, the thermistor having a resistance variable with its temperature, and the one of the relays performs switching operation in response to the thermistor resistance varied with abnormal heat generation of the motor.

This simple circuit configuration can reduce the rotational speed of the motor against an abnormal heat generation state to prevent damage of circuit parts even after the rotational speed of the motor is brought back to a normal one with diminishing of the abnormal heat generation.

Preferably, the thermistor has positive characteristics in which the resistance increase along a quadratic curve with increase of a temperature of the thermistor. This can prevent an abrupt temperature increase at a portion exposed to abnormal heat generation.

Figure 6:
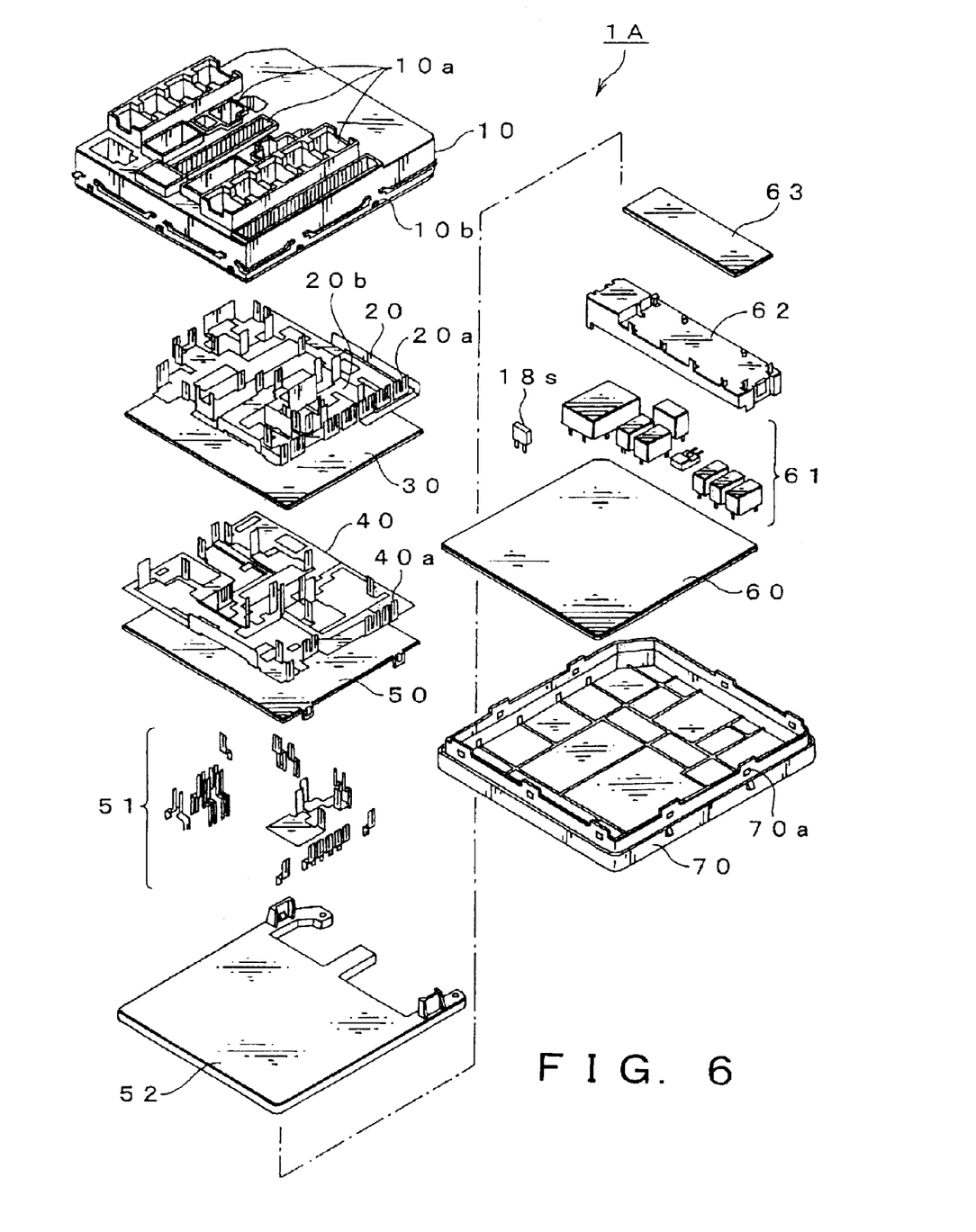
FIG. 6 is an exploded perspective view showing an electric junction box combined with a motor control unit according to the present invention.
Figure 7:
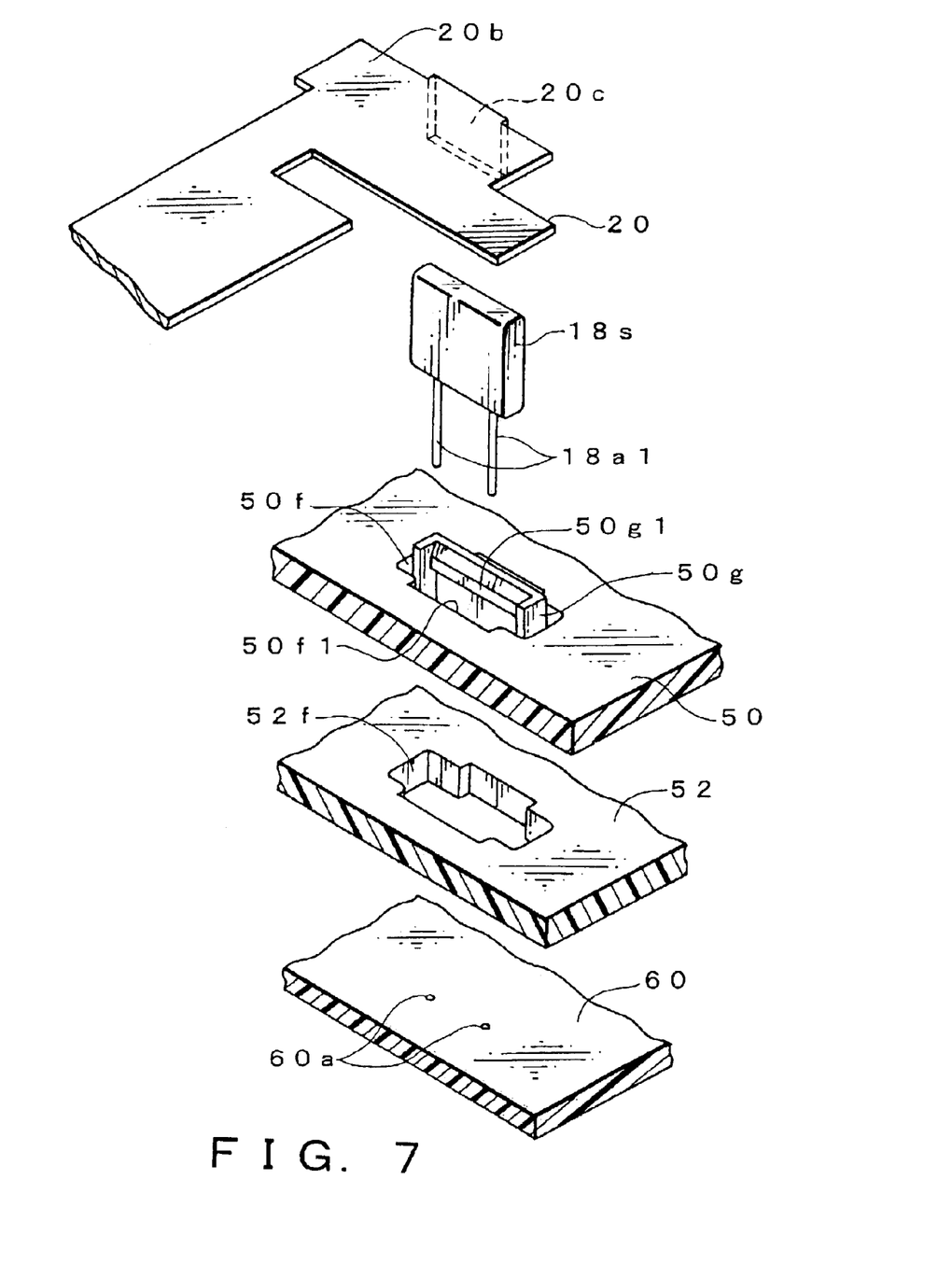
FIG. 7 is a partial exploded perspective view showing a configuration around an opening for a PTC of FIG. 6.

Preferably, as illustrated in FIGS. 6 and 7, the temperature sensing element contacts a busbar disposed between the battery and the motor to electrically connect thereto to detect a temperature of the busbar which is selected as the position for detecting abnormal heat generation.

Thus, abnormal heat generation due to overcurrent at the motor driving a cooling fan of a vehicle can be detected. That is, a busbar connected to the motor is surely prevented from abnormal heat generation thereof. That is, the busbar connected to the motor is surely prevented from abnormal heat generation thereof. Accordingly, the invention can surely prevent damages of electronic circuit parts associated with the motor operation and resin-made members like the plates.

DETAILED DESCRIPTION OF PREFERRED EMBODIMENTS

Referring to the accompanied drawings, embodiments of the invention will be discussed hereinafter.

FIG. 1 is a circuit diagram of a motor control unit according to the present invention. As illustrated in FIG. 1, the motor control unit is applied to an electric junction box 1A for a radiator cooling fan. The electric junction box 1A includes function circuits. The electric junction box 1A is mounted on an automotive vehicle and is disposed between a 12V battery 2 and a motor 3 driving the radiator cooling fan. The electric junction box 1A accommodates various types of electronic and resin-made parts and is arranged with busbars that are conductors distributing an electrical power from the battery 2. The busbars will be discussed later with reference to FIGS. 6 and 7.

The electric junction box 1A has a power input terminal 11, a ground terminal 12, output terminals 13a and 13b, and a signal input terminal 14. The power input terminal 11 is connected to the battery 2, and the ground terminal 12 is grounded. The output terminals 13a, 13b, and 13c are connected sequentially to one of terminals 3a, 3b, and 3c of the motor 3. To the signal input terminal 14, control signals are supplied for controlling the rotational speed of the motor 3 based on temperature values detected by a water temperature sensor (not shown). The control signals instruct the motor 3 to rotate at a low or middle speed when the temperature value is normal, while the control signals instruct the motor 3 to rotate at a high speed when the temperature value is high.

The electric junction box 1A also includes relays 15a, 15b, and 15c, transistors 16a and 16b, and a microcomputer 17. Furthermore, the electric junction box 1A includes a temperature sensing and current shut-down circuit 18a or a temperature sensing circuit 18b. The circuits 18a and 18b are incorporated with a temperature sensing element 18s, which will be discussed later with reference to FIG. 2.

The relay 15a has a coil 15a1 and a contact 15a2; the relay 15b has a coil 15b1 and a contact 15b2; and the relay 15c has a coil 15c1 and a contact 15c2. One end of each of coils 15a1, 15b1 and 15c1 is electrically connected to the battery 2 via the power input terminal 11. The other end of the coil 15a1 is electrically connected to a collector side of a transistor 16b, while the other end of each of the coils 15b1 and 15c1 is electrically connected to a collector side of a transistor 16a. One end of each of the contacts 15a2 and 15b2 is electrically connected to the battery 2 via the power input terminal 11. One end of the contact 15c2 is grounded via the ground terminal 12. The other end of each of the contacts 15a2, 15b2, and 15c2 is electrically connected sequentially to the terminals 3a, 3b, and 3c of the motor 3 via the output terminal 13a, 13b, or 13c.

The collectors of the transistors 16a and 16b are electrically connected as described above to the other end of the coil 15a1, 15b1, or 15c1 of the relays 15a, 15b, or 15c. Emitters of the transistors 16a and 16b are grounded. Each base of the transistors 16a and 16b is electrically connected to an output terminal TX1 or TX2 of the microcomputer 17.

The microcomputer 17 has input terminals RX1, RX2 and the output terminals TX1, TX2. The input terminal RX1 receives a detected temperature from the temperature sensing circuit 18b discussed later. The input terminal RX2 receives a control signal via the signal input terminal 14 based on an ON/OFF state of an ignition switch. In response to the signals received in the input terminals RX1 and RX2, the microcomputer 17 outputs a high or low level signal from the output terminals TX1 and TX2 to turn on or off the transistors 16a and 16b. The microcomputer 17 includes CPU 17a, ROM 17b, and RAM 17c. CPU 17a executes a control program stored in ROM 17b. RAM 17c serves primarily as a working area storing values of variables produced during processing of CPU 17a. ROM 17b stores a control program for a process according to the present invention as shown in FIG. 4. The process will be discussed later.

The temperature sensing and current shut-down circuit 18a and the temperature sensing circuit 18b are configured as illustrated respectively in FIG. 2A or 2B. As illustrated in FIG. 2A, the temperature sensing and current shut-down circuit 18a utilizes, for example, a known PTC (positive temperature coefficient thermistor) 18s. PTC 18s has a resistance increasing along a quadratic curve with increase of its temperature. The characteristic controls current flowing through the coils 15b1 and 15c1 of the relays 15b and 15c to control the opening and closing of the relays 15b and 15c. PTC 18s functions to shut down an electrical power supplied to the terminals 3b and 3c of the motor 3.

Furthermore, as illustrated in FIG. 2B, the temperature sensing circuit 18b has a PTC 18s one end of which is grounded and the other end of which is connected to a resistance 18r. The temperature sensing circuit 18b also has an analog-to-digital converter 18c, one end of which is connected to a connection point of the resistance 18r and the PTC 18s. The other end of the resistance 18r is applied with a predetermined constant voltage B+, for example, by the battery 2. The PTC 18s has a resistance varying with its temperature, so that a voltage at the connection point of the resistance 18r and the PTC 18s varies with the temperature. The voltage is converted to a digital value by the A–D converter 18c, which is supplied to the microcomputer 17. The microcomputer 17 executes a process shown in FIG. 4 based on the digital value. The selection of the temperature sensing circuit 18b requires only the direct connection of the coils 15b1 and 15c1 with the transistor 16a (corresponded to claims 6 and 7). In the meantime, the selection of the temperature sensing and current shut-down circuit 18a shown in FIG. 2A need not have the temperature sensing circuit 18b (corresponded to claim 9).

Figure 3A:
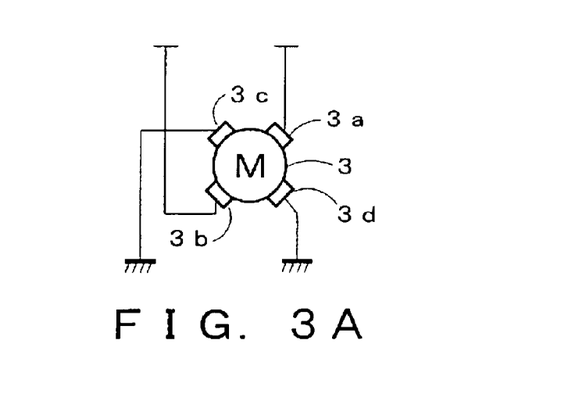
FIGS. 3A and 3B are each an explanatory illustration of a motor of FIG. 1.
Figure 3B:
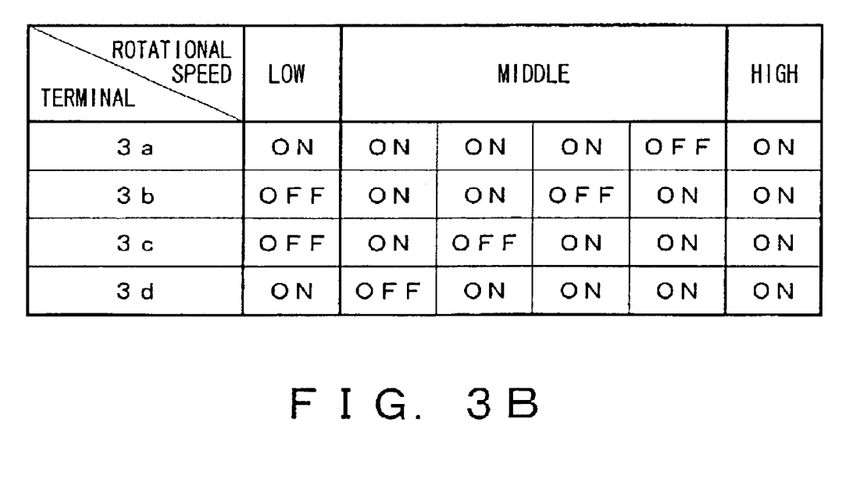

The motor 3 has a rotational speed varied with an electrical power supplied thereto. The motor 3 has four terminals 3a, 3b, 3c, and 3d, ON/OFF of which changes the rotational speed of the motor 3. For example, as illustrated in FIG. 3A, the motor 3 used in this embodiment has four terminals consisting of two power terminals 3a, 3b and two ground terminals 3c, 3d. The rotational speed of the motor 3 changes with ON/OFF states of the terminals as illustrated in FIG. 3B.

There is arranged an inner coil between the terminals 3a and 3c, between the terminals 3c and 3b, between the terminals 3b and 3d, and between the terminals 3d and 3a so as to be connected thereto. As illustrated in FIG. 3B, a maximum rotational speed is achieved where all of the terminals 3a, 3b, 3c, and 3d are turned on to be in a full connection state thereof. Because, the motor rotational speed depends on electrical currents flowing through the inner coils of the motor. A middle rotational speed of the motor is achieved when one of the terminals 3a, 3b, 3c, and 3d is turned off and the other three terminals are on, and a low rotational speed of the motor is achieved when the terminals 3a and 3d are on and the terminals 3b and 3c are turned off. The motor stops when no electrical power is applied to the terminals 3a and 3b. Such a variable speed motor can be used and arranged for example, as illustrated in FIG. 1. However, the arrangement is not limited in the example shown in FIG. 1 but may be modified within the spirit of the present invention.

Next, operation of the above-mentioned configuration will be discussed, in which the temperature sensing and current shut-down circuit 18a as illustrated in FIG. 2A, that is, the PTC 18s is arranged between the transistors 16a and the relays 15b, 15c and connected thereto. With turning-on of an ignition switch, an external signal to instruct the motor 3 to rotate at a high speed is supplied to the microcomputer 17 via the signal input terminal 14. In response to the signal, the microcomputer 17 outputs a high level signal to the base of each of the transistors 16a and 16b via the output terminal TX1 or TX2 to the transistors 16a and 16bs on. Thereby, the transistors 16a and 16b become each in a connection state between an emitter and a collector thereof.

Thereby, a current flows through the coil 15a1 to close the contact 15a2. With no abnormal heat generation of the busbars, the PTC 18s has a smaller resistance, so that a current flows through each of the coils 15b1 and 15c1 of the relays 15b and 15c to close the contacts 15b2 and 15c2. Thus, the terminal 3c of the motor 3 is grounded, so that an electrical power from the battery 2 is supplied to each of the terminals 3a and 3b via the output terminal 13a or 13b. Accordingly, the motor 3 rotates at a high speed as shown in FIG. 3B. In this specification, the opening and closing movement of the relays may be called as switching operation.

With no abnormal heat generation of the busbars, the PTC 18s has a smaller resistance, so that a current flows through each of the coils 15b1 and 15c1 of the relays 15b and 15c to close the contacts 15b2 and 15c2. The terminal 3c of the motor 3 is grounded, so that an electrical power from the battery 2 is supplied to each of the terminals 3a and 3b via the output terminal 13a or 13b. Accordingly, the motor 3 rotates at a high speed as shown in FIG. 3B to cool the engine.

On the contrary, when the vehicle runs through a water flooded road, water invasion may bring the cooling fan driven by the motor 3 to be in a completely or almost locked state. The motor 3 tends to continue the rotation against a resistance force of the water. This generates overcurrent called as a lock current, which flows through the busbars with abnormal heat generation thereof. The abnormal heat generation increases the resistance of the PTC 18s. Thereby, no current flows through the coils 15b1 and 15c1 of the relays 15b and 15c to open the contacts 15b2 and 15c2. Accordingly, the terminals 3b and 3c are brought each in an off state. An electrical power from the battery 2 is supplied only through the terminal 3a of the motor 3. The motor 3 is changed in a low speed state as shown in FIG. 3B. This deceases a total current flowing through the motor 3, so that the busbars receive no overcurrent to diminish abnormal heat generation. As a result, the motor 3 and corresponding electronic parts are protected from overcurrent and abnormal heat generation.

With the continuation of this state, the resistance of the PTC 18s decreases, so that a current begins to flow through each of the coils 15b1 and 15c1 of the relays 15b and 15c to close the contacts 15b2 and 15c2. Thereby, the terminal 3c of the motor 3 is grounded, and an electrical power from the battery 2 is supplied to each of the terminals 3a and 3b of the motor 3 via the output terminals 13a and 13b. Accordingly, the motor 3 begins to rotate at a high speed again as shown in FIG. 3B, which cools the engine. Note that the embodiment includes a sufficient waterproof construction to prevent a desirable state such as electrical leak and short-circuit.

As described above, the temperature sensing and current shut-down circuit 18a shown in FIG. 2A, which is simple, can reduce the rotational speed of the motor 3 in response to abnormal heat generation to prevent damage of circuit parts, while the temperature sensing and current shut-down circuit 18a can return the rotational speed of the motor 3 to a normal speed. The rotational speed of the motor 3 may be changed not only to any of high and low speeds but also to any of high, middle, and low speeds based on a temperature associated with the motor. Furthermore, the motor 3 may be stopped as an additional operation.

The aforementioned control may be accomplished by using a software stored in the microcomputer 17 as illustrated in FIG. 4A. Moreover, as illustrated in FIG. 4B, the relays may be brought in a shut-of state to keep a low speed of the motor 3. These operations will be discussed hereinafter.

FIGS. 4A and 4B are each a flowchart of an embodiment of a motor control unit according to the present invention. Particularly, FIG. 4A is a flowchart showing a process for automatically bringing back a shut-down state to a normal state. FIG. 4B is a flowchart showing a process for keeping a shut-down state. In the process, not the temperature sensing and current shut-down circuit 18a shown in FIG. 2B but the temperature sensing circuit 18b is taken, in which the coils 15b1 and 15c1 are directly connected to the transistor 16a. Furthermore, the microcomputer 17 receives an external control signal through the signal input terminal 14 to rotate the motor 3 at a high speed.

At a normal heat generation state of the busbars, the transistors 16a and 16b each receive a high level signal via the output terminal TX1 or TX2. Thereby, a current flows through each of the coils 15b1 and 15c1 of the relays 15b and 15c to close the contacts 15b2 and 15c2. Thus, the terminal 3c of the motor 3 is grounded, so that an electrical power from the battery 2 is supplied to the terminals 3a and 3b via the output terminals 13a and 13b. Accordingly, the motor 3 rotates at a high speed to cool the engine.

In the process of FIG. 4A for automatically releasing a shut-down state, step S1 obtains a voltage based on a temperature detected by the temperature sensing circuit 18b, and step S2 compares the detected temperature with a predetermined reference temperature corresponding to abnormal heat generation. When step S2 determines that the detected temperature is not less than the reference temperature (Y in step S2), step S3 decreases the rotational speed of the motor 3, while the processing goes to step S4a when step S2 determines otherwise (N is step S2).

That is, step S3 outputs a low level signal (L) from the output terminal TX1 and outputs a high level signal (H) from the output terminal TX2. Thereby, no current flows through the coils 15b1 and 15c1 of the relays 15b and 15c to open the contacts 15b2 and 15c2. Accordingly, the terminals 3b and 3c of the motor 3 become off. Thus, an electrical power from the battery 2 is supplied only to the terminal 3a of the motor 3, so that the motor 3 rotates at a low speed. This decreases a total current quantity flowing through the motor 3, and no overcurrent flows through the busbars, preventing abnormal heat generation thereof. Thus, the motor 3 and the associated electronic parts are protected from abnormal heat generation and overcurrent.

Meanwhile, step S4a compares a detected temperature with a reference shut-down temperature, i.e., compares an abnormal temperature with a reference temperature. When the detected temperature is determined to become smaller than the reference temperature, the processing goes to step S5 (Y in step S4a) which returns the rotational speed of the motor 3 from a reduced one to a normal one. Otherwise (N in step S4a), the processing returns to step S1.

Step S5 outputs a high level signal to the transistors 16a and 16b via the output terminals TX1 and TX2. As described above, the motor 3 rotates again at a high speed. In this embodiment, a sufficient waterproof protection is provided to prevent electrical leak and short-circuit due to water invasion.

The automatic shut-down recovery process of FIG. 4A repeats the steps described above to decrease the rotational speed of the motor 3 against abnormal heat generation. This prevents damage of circuit parts and returns the rotational speed of the motor 3 to a previous normal speed. The reference shut-down temperature may has hysterisis characteristics and may be different between step S2 and step S4a. This eliminates undesirable chattering during switching of the motor rotational speeds. The process of FIG. 4A corresponds to claim 7.

In place of the process shown in FIG. 4A, a shut-down holding process shown in FIG. 4B may be provided. In FIG. 4B, a hardware configuration is the same as that of FIG. 4A. The microcomputer 17 receives an external control signal to rotate the motor 3 at a high speed. In FIG. 4B, processes designated by the same reference numerals as those of FIG. 4A have operational effects the same as FIG. 4A, which will not be discussed again.

The shut-down holding process shown in FIG. 4B has step S4b in place of step S4a of FIG. 4A. The step S4b determines the presence of a shut-down release instruction. When the shut-down release instruction is provided (Y in step S4b), the rotational speed of the motor 3 is controlled to return to a previous normal speed from a reduced speed. The shut-down release instruction is an external control signal that is supplied through a trigger of a manual switching operation for returning the rotational speed of the motor 3 to a previous normal speed from a reduced speed. The microcomputer 17 receives the external control signal via the signal input terminal 14 and the input terminal RX2.

This process can surely prevent damage of circuit parts which will be otherwise caused by overcurrent and abnormal heat generation, and the shut-down release instruction can return the rotational speed of the motor 3 to the previous normal speed. The process of FIG. 4B corresponds to claim 8. The fuse F of FIG. 1 is not inevitable but may be provided against overcurrent that will instantaneously damage associated circuit parts. Preferably, such a fuse is blown at a temperature higher than that of the conventional art of FIG. 8.

The electric junction box 1 shown in FIG. 1 may be replaced by another embodiment shown in FIG. 5A or FIG. 5B. In an embodiment of FIG. 5A, a motor control unit 1' has a three-terminal-type motor 3' that can change the motor rotational speed between a high speed and a low speed by selecting ON/OFF states of control signal input terminals 3a' and 3b'. Note that a terminal 3d' is a ground terminal. In this embodiment, twin relays are provided, which are relays 15a's and 15b'. The relay 15a' switches ON/OFF for electrical supply to the three-terminal-type motor 3' to control rotation and stopping of the motor 3'. The three-terminal-type motor 3' and there lays 15a', 15b' themselves are known ones, which will not be discussed in detail. A temperature sensing and current shut-down circuit 18a' is equal to the temperature sensing and current shut-down circuit 18a including the PTC 18s of FIG. 2A and is arranged in a collector side of a transistor 16a'. A power input terminal 11', output terminals 13a' and 13b', a signal input terminal 14', and a microcomputer 17' are configured equally to the power input terminal 11, the output terminals 13a and 13b, the signal input terminal 14, and the microcomputer 17 of FIG. 1, which will not be discussed again.

In this configuration, the relay 15b' is switched to change the rotational speed of the motor 3' from a high speed to a low speed in response to detection of abnormal heat generation. This protects associated electronic parts and the motor from abnormal heat generation and overcurrent. The motor continues to rotate at the low speed, which serves to cool the engine. A temperature detecting circuit (not shown) equal to that of FIGS. 1 and 2B may be provided to enable a control process as shown in FIG. 4.

In another embodiment of FIG. 5B, a motor control unit 1" has a two-terminal-type motor 3" that can change the motor rotational speed between a high speed and a low speed by changing current supplied to the terminal 3a". Note that a terminal 3d' is a ground terminal. In this embodiment, the relays 15a' and 15b' are provided, which are electrically connected to the terminal 3a" to change the rotation speed of the motor 3". The two-terminal-type motor 3" and the relays 15a", 15b" themselves are known ones, which will not be discussed in detail. A temperature sensing and current shut-down circuit 18a" is equal to the temperature sensing and current shut-down circuit 18a including the PTC 18s of FIG. 2A and is arranged in a collector side of a transistor 16a". A power input terminal 11", output terminals 13a" and 13b", a signal input terminal 14", and a microcomputer 17" are configured equally to the power input terminal 11, the output terminals 13a and 13b, the signal input terminal 14, and the microcomputer 17 of FIG. 1, which will not be discussed again.

In this configuration, the relays 15a" and 15" are switched to control current supplied to the terminal 3a" so as to decrease the rotational speed of the motor 3" in response to detection of abnormal heat generation. This protects associated electronic parts and the motor from abnormal heat generation and overcurrent. The motor continues to rotate at the low speed, which serves to cool the engine. A temperature detecting circuit (not shown) equal to that of FIGS. 1 and 2B may be provided to allow a control process as shown in FIG. 4. This embodiment may be provided with relays for switching ON/OFF states of two contacts or the twin relays which are described in the other embodiments. The combination of the motor and the relays may be suitably modified. The switching of the motor rotational speed may be carried out to provide three step speeds.

At last, referring to FIGS. 6 and 7, an electric junction box including busbars and the PTC 18s that is the temperature sensing element will be discussed. FIG. 6 is an exploded perspective view showing an electric junction box associated with a motor control unit. FIG. 7 is a partial exploded perspective view showing a configuration around an opening for a PTC.

As illustrated in FIG. 6, an electric junction box 1A has a box defined by an upper cover 10 and a lower cover 70. The box accomodates parts including a first busbar 20, a wiring board 30, a second busbar 40, a terminal plate cover 50, busbar connection terminals 51, a terminal plate 52, a primary circuit board 60, electronic elements 61, an element holder 62, and a secondary circuit board 63. As illustrated in FIG. 6, the primary circuit board 60, the terminal plate 52, the terminal plate cover 50, the second busbar 40, the wiring board 30, and the busbar 20 are sequentially layered.

The upper cover 10 is defined in a generally square case opened downward. The upper cover 10 has an upper wall formed with a connector section 10a like a socket opened upward for receiving connectors, fuses, and relays. The connector section 10a accommodates a row of terminals each protruding in an outward direction, which will be discussed later. The upper cover 10 has a side wall formed with a plurality of locking holes 10b for the engagement with the lower cover 70.

The busbar 20 is provided with a row of tab-shaped connector terminals 20a rising upward. These connector terminals 20a constitute a part of the terminals received in the connector section 10a. A PTC receiving portion 20b opposed to an upper portion of the PTC is formed with a contact piece discussed later. Under these components, there is disposed the wiring board 30.

Under the busbar 20 and the wiring board 30, there is laid the second busbar 40. The second busbar 40 is configured similarly to the first busbar 20 and has a row of tab-shaped connector terminals 40a rising upward. These connector terminals 40a are also received in the connector section 10a. However, the second busbar 40 has no contact piece unlike the first busbar 20. The first busbar 20 and the second busbar 40 are elongated like bands, of course, to be electrically conductive.

Under the second busbar 40, there are laid the terminal plate cover 50 and the terminal plate 52 which hold a plurality of the busbar connection terminals 51 therebetween. The terminal plate cover 50 and the terminal plate 52 are made of a resin material for electrically insulating the primary circuit board 60 from the side of the busbars. The busbar connection terminals 51 are, of course, electrically conductive. More specifically, each busbar connection terminal 51 is received in each of terminal holding pieces (not shown) formed in the terminal plate 52 to contact a portion of the primary circuit board 60 in the rear side of the terminal plate 52. The terminal plate cover 50 has a plurality of openings (not shown) opposed to the busbar connection terminals 51 attached to the terminal plate 52. Through the openings, the busbar connection terminals 51 protrude upward when the terminal plate cover 50 is layered on the terminal plate 52.

Under the terminal plate 52, there is laid the primary circuit board 60. On the primary circuit board 60, there are arranged electronic elements 61, which includes the relays, regulators, and diodes, and the PTC 18s. The electronic elements 61 are covered by the holder 62 having a lower opening. The holder 62 has upper surface on which a secondary circuit board 63 is layered. On the secondary circuit board 63, the microcomputer 17 is arranged.

A group of the components designated by reference numerals 20, 30, 40, 50 to 52, 60 to 63, etc. are received in the lower cover 70 of a generally square tray made of a resin material. The lower cover 70 has a side wall formed with a plurality of locking hooks 70a which engage with the locking holes 10b of the upper cover 10 to couple the upper cover 10 with the lower cover 70.

Referring to FIG. 7, the PTC receiving portion 20b of the first busbar 20 has a side peripheral portion formed with a contact piece 20c with a downwardly L-shaped section. The contact piece 20c contacts a side surface of the PTC 18s.

The PTC 18s has a resistance increasing with temperature when heated by overcurrent flowing through the busbar. This decreases or shuts down current flowing through the busbar to protect an associated circuit and a resin-made member. The PTC 18s illustrated herein is defined in a rectangular plate shape having a given thickness but may be a generally known, circular one. The PTC 18s has a pair of lead terminals 60a connected to the primary circuit board 60 by soldering to extend downward.

The terminal plate cover 50 has a PTC insertion hole 50f for passing the PTC. The PTC insertion hole 50f is defined to correspond to the shape of the PTC 18s and is formed with a cutout 50f1 in a side wall thereof for inserting the contact piece 20c thereinto. The PTC insertion hole 50f is formed with another side wall opposed to the cutout 50f1, which receives a channel member 50g unitarily defined with the terminal plate cover 50. The channel member 50g surrounds a side wall of the PTC 18s. The channel member 50g has a U-shape section as described later and is formed with a protrusion 50g1 at an upper end thereof.

The terminal plate 52 has a hole 52f having the same shape as the PTC insertion hole 50f for the PTC. The primary circuit board 60 is formed with a pair of terminals holes 60a in which the lead terminals 18a1 of the PTC 18s are inserted to be connected thereto by soldering.

The contact piece 20c is received in a clearance between the channel member 50g (more specifically, the protrusion 50g1) and the cutout 50f1 of the PTC insertion hole 50f. The channel member 50g has a resiliency enough to contact the PTC 18s with the contact piece 20c. Thereby, the contact piece 20c, i.e., the busbar 20 surely contacts the PTC 18s, so that a temperature of the busbar 20 can be sensed.

In the embodiments described above, the PTC 18s detects abnormal heat generation due to overcurrent of the motor 3 driving a radiator cooling fan through the busbar. Based on the detection, the rotational speed of the motor 3 is decreased but is not completely stopped. Thus, the simple configuration can surely prevent damage of circuit parts against overcurrent and abnormal heat generation, with keeping a primary function of the vehicle operation system (such as a cooling function of the motor driving the radiator cooling fan). Furthermore, the rotational speed of the motor 3 returns automatically to a previous normal speed when a sensed temperature becomes normal again. In addition, it may be selected to keep a shut-down state of the motor.

The present invention is not limited in application for an electric junction box. The temperature sensing element may be arranged between a base pole and an earth pole of another transistor different from the one described in the embodiments. The motor is used for the radiator cooling fan in the embodiments but may be one for driving wipers. The temperature may be sensed not only at the busbar but also at another position of a power circuit in the junction box. The transistors and the temperature sensing elements may be changed to other type ones. The present invention includes embodiments modified within the spirit of the present invention.

What is claimed is:

1. An electric motor control unit mounted in an automotive vehicle comprising:

a motor used for driving a cooling fan of a radiator, the motor being supplied with electrical power from a battery, the motor having a variable rotational speed;

a temperature sensing element disposed at a position of the motor control unit where abnormal heat is generated as a result of overcurrent supplied to the motor; and a rotational speed control means for reducing the rotational speed of the motor without stopping the motor based on detection of abnormal heat generation by the temperature sensing element, wherein the rotational speed control means has a plurality of relays arranged between the battery and the motor, and at least one of the relays permits a switching operation based on detection of abnormal heat generation to control electrical power supplied to the motor so as to reduce the rotational speed of the motor, and wherein the temperature sensing element is a thermistor, one end of which is grounded and the other end of which is connected to the one of relays, the thermistor having a resistance which varies with its temperature, and the one of the relays performs switching operation in response to the thermistor resistance varied with abnormal heat generation of the motor.

2. The motor control unit according to claim 1, wherein the motor has four terminals including three input terminals for changing the rotational speed of the motor to become any of high, middle, and low speeds by selecting on-off states of the three input terminals, and each of the relays is respectively connected to each of the three input terminals, and wherein the relays can switch the on-off states of the input terminals based on detection of abnormal heat generation by the temperature sensing element so that the rotational speed of the motor can be changed from the high speed to the low speed.

3. The motor control unit according to claim 1, wherein the motor has three terminals including two input terminals for changing the rotational speed of the motor to become any of high and low speeds by selecting on-off states of the two input terminals, and each of the relays is respectively connected to each of the two input terminals, and wherein the relays can switch the on-off states of the input terminals based on detection of abnormal heat generation by the temperature sensing element to change the rotational speed of the motor from the high speed to the low speed.

4. The motor control unit according to claim 1, wherein the motor has two terminals including one input terminal, the rotational speed of the motor being variable with current supplied to the input terminal, and two of the relays are connected to the input terminal for allowing the rotational speed of the motor to be variable, wherein the relays can perform switching operation based on detection of abnormal heat generation by the temperature sensing element to change the rotational speed of the motor to a lower speed.

5. The motor control unit according to claim 1, wherein at least one of the relays operates to reduce the rotational speed of the motor when a temperature detected by the temperature sensing element is higher than a reference temperature showing abnormal heat generation, and the one of relays operates to return the rotational speed of the motor to a normal speed when the temperature detected by the temperature sensing element has become lower than the reference temperature.

6. The motor control unit according to claim 5, wherein the one of relays operates to reduce the rotational speed of the motor when the temperature detected by the temperature sensing element is higher than the reference temperature, and the reduced speed of the motor is maintained until a predetermined release command is given to the motor control unit.

7. The motor control unit according to claim 1, wherein the thermistor has positive characteristics in which the resistance increases along a quadratic curve with increase of a temperature of the thermistor.

8. The motor control unit according to claim 7, wherein the temperature sensing element contacts a busbar disposed between the battery and the motor to electrically connect thereto to detect a temperature of the busbar which is selected as the position for detecting abnormal heat generation.

9. An electric motor control unit mounted in an automotive vehicle, the motor control unit having a motor supplied with an electrical power from a battery, the motor being variable in its rotational speed, the motor control unit comprising:

a temperature sensing means disposed at a position of the motor control unit where abnormal heat is generated due to overcurrent supplied to the motor; and a rotational speed control means for reducing the rotational speed of the motor without stopping the motor based on detection of abnormal heat generation by the temperature sensing means, wherein the temperature sensing means contacts a busbar disposed between the battery and the motor to electrically connect thereto to detect a temperature of the busbar which is selected as the position for detecting abnormal heat generation, and wherein the rotational speed control means has a plurality of relays arranged between the battery and the motor, and at least one of the relays permits a switching operation based on detection of abnormal heat generation to control electrical power supplied to the motor so as to reduce the rotational speed of the motor.

* * * * *